(12) United States Patent
Goto et al.

(10) Patent No.: US 7,981,463 B2
(45) Date of Patent: Jul. 19, 2011

(54) HOT-DIP SN-ZN COATED STEEL SHEET HAVING EXCELLENT CORROSION RESISTANCE

(75) Inventors: Yasuto Goto, Kitakyushu (JP); Masao Kurosaki, Kitakyushu (JP); Toshinori Mizuguchi, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/708,317

(22) Filed: Feb. 18, 2010

(65) Prior Publication Data

US 2010/0151117 A1 Jun. 17, 2010

Related U.S. Application Data

(63) Continuation of application No. 11/922,164, filed as application No. PCT/JP2006/313394 on Jul. 5, 2006, now abandoned.

(30) Foreign Application Priority Data

Jul. 5, 2005 (JP) .................................. 2005-196192

(51) Int. Cl.
*B05D 1/18* (2006.01)
(52) U.S. Cl. ............................. 427/8; 427/435; 427/436
(58) Field of Classification Search .............. 427/8, 435, 427/436
See application file for complete search history.

(56) References Cited

U.S. PATENT DOCUMENTS

| | | | |
|---|---|---|---|
| 5,827,618 A | 10/1998 | Oyagi et al. | |
| 2003/0059642 A1* | 3/2003 | Mei ............................. | 428/570 |
| 2006/0003180 A1 | 1/2006 | Goto et al. | |

FOREIGN PATENT DOCUMENTS

| | | |
|---|---|---|
| EP | 0763608 A1 | 3/1997 |
| EP | 1477582 A2 | 11/2004 |
| EP | 1561835 A1 | 8/2005 |
| JP | 52-130438 | 11/1977 |
| JP | 3126622 | 11/2000 |
| JP | 3126623 | 11/2000 |
| JP | 2002-038250 | 2/2002 |
| JP | A-2002-038250 | 6/2002 |
| JP | 2002332556 | 11/2002 |
| JP | 2002332556 A * | 11/2002 |

(Continued)

OTHER PUBLICATIONS

Decision on Grant issued on Russian patent Application No. 2007149548/02 with English translation thereof.

(Continued)

*Primary Examiner* — David Turocy
(74) *Attorney, Agent, or Firm* — Dorsey & Whitney LLP

(57) ABSTRACT

An exemplary embodiment of manufacturing a hot-dip Sn—Zn coated steel sheet is provided which can include pre-coating a Fe—Ni alloy containing between about 10 to 80 mass % of Ni, and a remainder being Fe on a steel sheet, immersing the steel sheet into a Sn—Zn hot-dip coating bath so as to form a hot-dip coating layer on the steel sheet, cooling the hot-dip coating layer at a cooling rate of about 10° C./sec to about 30° C./sec so as to obtain a hot-dip Sn—Zn coated steel sheet, measuring a differential scanning calorimetric curve of the hot-dip Sn—Zn coated steel sheet by a differential scanning calorimetry, and distinguishing whether the hot-dip Sn—Zn coated steel sheet has an objective microstructure by the measured differential scanning calorimetric curve.

6 Claims, 1 Drawing Sheet

FOREIGN PATENT DOCUMENTS

| | | |
|---|---|---|
| JP | 2003268521 | 9/2003 |
| JP | 2004-131819 | 4/2004 |
| JP | 2004-360019 | 12/2004 |
| JP | 2007-524090 | 12/2010 |
| SU | 346399 | 7/1972 |
| WO | 96/30560 | 10/1996 |
| WO | 2004/033745 A1 | 4/2002 |
| WO | 2005/080635 A1 | 9/2005 |

OTHER PUBLICATIONS

European Search Report dated Jan. 21, 2010 for European Application No. 06767900.1.

Lin, Kwang-Lung et al., (2003) "Electrodeposition of Eutectic Sn-Zn alloy by Pluse Plating", pp. 2203-2207.

European Office action for EP 06767900.1 mailed Dec. 1, 2010.

English Summary of Japanese Office Action for Japanese Application No. JP 2007-524090 mailed on Dec. 7, 2010.

* cited by examiner

US 7,981,463 B2

HOT-DIP SN—ZN COATED STEEL SHEET HAVING EXCELLENT CORROSION RESISTANCE

CROSS-REFERENCE TO RELATED APPLICATIONS

This application is a continuation application of U.S. application Ser. No. 11/922,164, filed on Dec. 11, 2007, now abandoned, which is a national stage application of PCT Application No. PCT/JP2006/313394 which was filed on Jul. 5, 2006, and published on Jan. 11, 2007 as International Publication No. WO 2007/004671 (the "International Application"). This application claims priority from U.S. application Ser. No. 11/922,164 pursuant to 35 U.S.C. §120. The disclosures of the above-referenced applications are incorporated herein by reference in their entireties.

FIELD OF THE INVENTION

The present invention relates to a hot-dip Sn—Zn coated steel sheet which may exhibit excellent corrosion resistance, weldability, and formability, and which can be adapted for use in the manufacture of, e.g., vehicle fuel tanks, domestic electric appliances, industrial machinery, and the like.

BACKGROUND INFORMATION

Pb—Sn alloy coated steel sheets can exhibit excellent corrosion resistance, formability, solderability (weldability), and the like, and have been used as materials for fuel tanks, for example, for vehicle fuel tanks. Although Pb—Sn alloy coated steel sheets can be used as materials for vehicle fuel tanks due to their excellent properties (for example, seam weldability and the like), Pb-free materials may be preferable for reasons relating, e.g., to the global environment.

Sn—Zn alloy coated steel sheets can be manufactured using electroplating techniques for electrolyzing a bare steel sheet in an aqueous solution containing Zn and Sn ions as described, for example, in Japanese Patent Publication No. S52-130438. Sn—Zn alloy coated steel sheets having Sn as a main component can be used for electronic parts due to their excellent corrosion resistance and solderability. Such Sn—Zn alloy coated steel sheets can exhibit excellent properties for use in vehicle fuel tanks.

For example, hot-dip Sn—Zn system coated steel sheets are described, e.g., in Japanese Patent Nos. 3126622 and 3126623, and in International Publication No. WO 96/30560. Such hot-dip Sn—Zn system coated steel sheets can exhibit reliable corrosion resistance, formability and solderability. However, there may be a need to further improve corrosion resistance. For example, pitting corrosion due to Zn segregation can occur even in an unprocessed flat portion of a Sn—Zn coated steel sheet. For example, because red rust can be produced in a short time in a salt spray test which can be similar to salt-damaging environments, there may be an insufficient corrosion resistance in salt-damaging environments. The amount of Zn in such materials may be increase to further improve a sacrificial corrosion resistance effect. However, if such addition of Zn is excessive, a main component of a coating layer may transition from Sn to Zn. Thus, Zn can be eluted even more than Sn, which may result in a deterioration of corrosion resistance of the coating layer.

SUMMARY OF EXEMPLARY EMBODIMENTS OF THE INVENTION

Exemplary embodiments of the present invention are provided which can overcome the problems described above and may provide a hot-dip Sn—Zn coated steel sheet which may exhibit excellent corrosion resistance, formability, and weldability with good balance there between, without using Pb.

A hot-dip Sn—Zn coating microstructure can become a solidified microstructure having, for example, a mixture of Sn primary crystals and binary Sn—Zn eutectic cells. Zn from which corrosion may initiate can be segregated in a grain boundary between eutectic crystal cells. Thus, many studies have been performed to suppress growth of such eutectic crystal cells while promoting growth of Sn primary crystals. Accordingly, a coating layer having sufficiently crystallized Sn primary crystals and a coating layer having grown Sn—Zn eutectic cells can exhibit respective unique melting behavior and an endothermic value of melting heat generated by Sn primary crystals can exhibit a unique melting behavior in a thermal analysis.

Thus, Zn segregation can be alleviated by adjusting a ratio of an endothermic value of melting heat generated by Sn primary crystals and an endothermic value of melting heat generated by Sn—Zn eutectic crystals in a specified region.

An exemplary hot-dip Sn—Zn coated steel sheet in accordance with exemplary embodiments of the present invention can include, e.g.: a steel sheet and a hot-dip coating layer which may be formed on a surface of the steel sheet and which can include between about 1 and about 8.8 mass % of Zn, and the remainder including between about 91.2 and about 99.0 mass % of Sn and inevitable impurities. A ratio of an endothermic value of melting heat generated by Sn—Zn eutectic crystals and an endothermic value of melting heat generated by Sn primary crystals in the hot-dip coating layer can be selected to satisfy the following relationship:

(endothermic value of melting heat generated by Sn primary crystals)/ {(endothermic value of melting heat generated by Sn primary crystals)+(endothermic value of melting heat generated by Sn—Zn eutectic crystals)} $\geq 0.3$.

A temperature of an endothermic peak generated by the Sn primary crystals melting can be between about 200° C. and about 230° C., and a temperature of an endothermic peak generated by the Sn—Zn eutectic crystals melting can be between about 198° C. and about 200° C.

An exemplary hot-dip Sn—Zn system coated steel sheet in accordance with a further exemplary embodiment of the present invention can include a steel sheet and a hot-dip coating layer which can be formed on a surface of the steel sheet and which may contain between about 4 and about 8.8 mass % of Zn, and the remainder including between about 91.2 and about 96.0 mass % of Sn and inevitable impurities. A ratio of an endothermic value of melting heat generated by Sn—Zn eutectic crystals and an endothermic value of melting heat generated by Sn primary crystals in the hot-dip coating layer can be selected to satisfy the following relationship:

(endothermic value of melting heat generated by Sn primary crystals)/ {(endothermic value of melting heat generated by Sn primary crystals)+(endothermic value of melting heat generated by Sn—Zn eutectic crystals)} $\geq 0.3$.

A temperature of an endothermic peak generated by the Sn primary crystals melting can be between about 200° C. and about 230° C., and a temperature of an endothermic peak generated by the Sn—Zn eutectic crystals melting can be between about 198° C. and about 200° C. Such endothermic values can include, e.g., values measured at a temperature of an endothermic peak generated by melting of Sn primary crystals and at a temperature of an endothermic peak generated by melting of Sn—Zn eutectic crystals, using a differential scanning calorimeter (DSC).

Hot-dip Sn—Zn coated steel sheets in accordance with exemplary embodiments of the present invention can provide, e.g., Pb-free rust prevention steel sheet which may be used to form a fuel tank, and which can exhibit excellent corrosion resistance, formability and weldability, and may further exhibit long-term durability against deteriorated gasoline and the like. Accordingly, such exemplary hot-dip Sn—Zn coated steel sheets can exhibit properties which may be appropriate for Pb-free materials used to form fuel tanks.

These and other objects, features and advantages of the present invention will become apparent upon reading the following detailed description of embodiments of the invention, when taken in conjunction with the appended claims.

BRIEF DESCRIPTION OF THE DRAWING

Further objects, features and advantages of the invention will become apparent from the following detailed description taken in conjunction with the accompanying figure showing illustrative embodiments, results and/or features of the exemplary embodiments of the present invention, in which.

DETAILED DESCRIPTION OF EXEMPLARY EMBODIMENTS OF THE INVENTION

Figure 1:
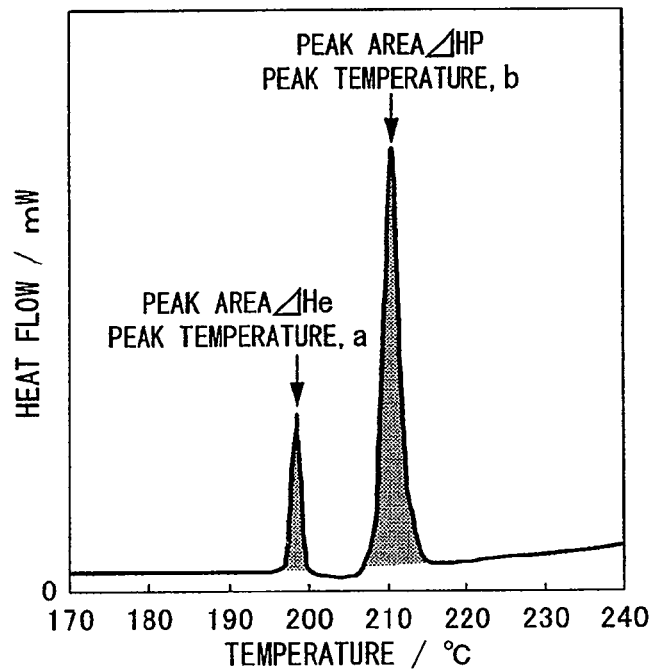
FIG. 1 is graph showing an exemplary differential scanning calorimetric curve of a coating layer according to exemplary embodiments of the present invention, in which 'a' can represent a temperature of an endothermic peak of Sn—Zn eutectic crystals, and 'b' can represent a temperature of an endothermic peak temperature of Sn primary crystals.

A hot-dip Sn—Zn system coated steel sheet in accordance with exemplary embodiments of the present invention can include a steel sheet and a hot-dip coating layer formed on a surface of the steel sheet. Such steel sheet may include, for example, an annealed steel sheet or a rolled material, and such annealed steel sheet can be obtained by subjecting a steel casting to a series of processes including, e.g., hot rolling, acid pickling, cold rolling, annealing, temper rolling, and the like. The exemplary steel sheet can include components which may facilitate (i) a fuel tank to be processed into a complicated shape, (ii) an alloy layer foamed at a steel-coating layer interface to be thin, (iii) a coating thereon to be prevented from being peeled off, and (iv) a prevention of a corrosion advancement inside a fuel tank formed from such sheet and in external environments.

For example, because the formation of a fuel tank can generally use a high level of formability, it may be preferable to apply an interstitial atom free ("IF") steel having excellent formability, and it may also be preferable to use a steel sheet which can include several ppm of B in order to provide a weld airtight property, secondary formability, and the like. Such exemplary IF steel may include the following composition: C≦about 0.003 mass %, Si<about 0.01 mass %, Mn: about 0.10 mass % to about 0.20 mass %, P<about 0.025 mass %, S: about 0.005 mass % to about 0.02 mass %, Ti: about 0.040 mass % to about 0.060 mass %, and a remainder of Fe and inevitable impurities. Such IF steel may further include about 5 ppm of B. For example, the IF steel may include the following particular composition: C: about 0.003 mass %, Si: about 0.01 mass %, Mn: about 0.20 mass %, P: about 0.01 mass %, S: about 0.01 mass %, Ti: about 0.06 mass %, and a remainder of Fe and inevitable impurities.

In an exemplary hot rolling procedure, a slab can be heated at about 1150° C., and then hot-rolled to a thickness of about 3 to 6 mm. The rolled steel can then be subjected to acid pickling, and thereafter cold rolled to a thickness of about 0.5 to 1.5 mm. Next, rolling oil, iron powder, and the like which may be present on a surface thereof can be removed by alkaline electrolysis, and the rolled steel can then be annealed. The annealing may be a continuous annealing based on cost considerations, and may also be a batch annealing. The rolled steel can then be subjected to temper rolling, preliminary hot-dip coating of Ni or an Fe—Ni alloy, and hot-dip coating using a plating technique such as, e.g., a flux method.

In exemplary embodiments of the present invention, a Sn—Zn alloy coating can be formed using a hot-dip coating technique. Such hot-dip coating technique can be used to provide a sufficient coating weight. An electroplating technique may be less economical, although it may also secure sufficient coating weight through a long electrolysis procedure. A preferable range of target coating weight can be between about 10 and about 150 g/m$^2$ (on a single surface side), which may be a relatively heavy coating weight. Therefore, the hot-dip coating method may be preferable. Further, such hot-dip coating method can be preferable for a Sn—Zn alloy because it may be difficult to control composition of the Sn—Zn alloy if a potential difference between coating elements is large.

An exemplary hot-dip Sn—Zn coating layer can include, e.g., between about 1 and about 8.8 mass % of Zn and the remainder can include between about 91.2 and about 99.0 mass % of Sn and inevitable impurities. Zn in the coating composition can be limited based on a balance of corrosion resistance in the inner and outer surfaces of a fuel tank. The outer surface of the fuel tank may preferably exhibit full rust prevention capability, and can thus be coated with paint after the fuel tank is shaped. Accordingly, painting thickness may have an effect on the rust prevention capability. Further, a corrosion resistance effect of a coating layer can restrain an occurrence of red rust. For example, a corrosion resistance effect of the coating layer can be important for a portion of a surface which is not well coated.

A potential of the coating layer can be lowered by an addition of Zn to a Sn-based coating, which can provide a sacrificial corrosion resistance to the coating layer. For example, about 1 mass % or more of Zn can be added to such coating. The addition of more than, e.g., about 8.8 mass % of Zn, which corresponds to a binary Sn—Zn eutectic point, can increase the melting point, and thereby promote a growth of coarse Zn crystals. This exemplary effect can further lead to excessive growth of an intermetallic compound layer (e.g., an alloy layer) underlying the coating layer. Thus, the exemplary content of Zn may preferably be about 8.8 mass % or less. Although such coarse Zn crystals may provide a sacrificial corrosion resistance capability, selective corrosion may be more likely to occur in such coarse Zn crystals. Further, since the intermetallic compound can be brittle, coating cracks may likely occur during press forming due to growth of the intermetallic compound layer of the coating underlying layer, which may result in a deterioration of a corrosion resistance effect of the coating layer.

On the other hand, the corrosion in the inner surface of the fuel tank does not become a problem for only the normal gasoline. However, there is a possibility that the inner surface of the fuel tank may be exposed to a severe corrosion environment due to mixture of water or chlorine ions into gasoline, generation of organic carboxylic acid produced by oxidative deterioration of gasoline, and the like. If gasoline leaks out of the fuel tank due to a perforated corrosion, it may lead to a serious accident. Thus it may be important to completely prevent the inner surface of the fuel tank from being corroded, deteriorated gasoline containing the above-mentioned corrosion promoting components may be produced, and properties under various conditions can be examined. As a results, a Sn—Zn alloy coating may be provided, which can contain about 8.8 mass % or less of Zn has excellent corrosion resistance.

A coating layer which can contain only Sn with no Zn, or Sn and less than about 1 mass % of Zn, likely may not exhibit sacrificial corrosion resistance capability for a bare steel sheet (e.g., a material to be coated) from an initial stage when the coating layer is exposed to a corrosion environment. Thus, an inner surface of a fuel tank formed from such material may exhibit problematical pitting corrosion at a coated pin hole portion, and an outer surface of the fuel tank may further exhibit a problem of early occurrence of red rust.

Alternatively, if the coating layer contains more than about 8.8 mass % of Zn, Zn may preferably melt, thereby producing a plurality of corrosion products in a short time. This can cause clogging of a carburetor for an engine when such hot-dip Sn—Zn system coated steel sheet is used for a fuel tank. Further, as the content of Zn increases, formability of the coating layer may deteriorate, thereby deteriorating press formability which can be a characteristic of Sn-based coatings. In addition, a solderability may deteriorate with an increase in Zn content due to a formation of Zn oxides and a rise in a melting point of the coating layer.

Accordingly, in certain exemplary embodiments of the present invention, the content of Zn in an exemplary Sn—Zn alloy coating may be between about 1 and about 8.8 mass %, or more preferably between about 4.0 and about 8.8 mass %, which can provide an improved sacrificial corrosion resistance effect.

Melting behavior of the coating layer can be an important factor, and may relate to a balance of corrosion resistance in an inner surface and an outer surface of a fuel tank formed using a material having such coating layer, and manufacturability thereof.

In exemplary embodiments of the present invention, the ratio of an endothermic value of melting heat generated by Sn—Zn eutectic crystals and an endothermic value of melting heat generated by the Sn primary crystals in the hot-dip coating layer can satisfy the following relationship:

(endothermic value of melting heat generated by Sn primary crystals)/ {(endothermic value of melting heat generated by Sn primary crystals)+(endothermic value of melting heat generated by Sn—Zn eutectic crystals)} $\geq 0.3$.

Such endothermic value ratio can be based, e.g., on the observation that a microstructure of the Sn—Zn coating layer may change significantly when the above ratio is equal to 0.3. For example, in a coating microstructure exhibiting a thermal analysis behavior whereby the ratio (endothermic value of melting heat generated by Sn primary crystals)/{(endothermic value of melting heat generated by Sn primary crystals)+ (endothermic value of melting heat generated by Sn—Zn eutectic crystals)}<0.3, Sn—Zn eutectic crystal cells may be grown over the entire surface, and Zn segregation may likely form which can pass through the coating layer in a depth direction of a Sn—Zn eutectic crystal cell-eutectic crystal cell grain boundary.

Alternatively, in a coating microstructure exhibiting a thermal analysis behavior where this same ratio is $\geq 0.3$, Sn primary crystals in an amount sufficient to suppress Sn—Zn eutectic crystal cells from being solidified may be crystallized out. This can facilitate a significant decrease in Zn segregation. Accordingly, a corrosion resistance of the coating layer can be rapidly enhanced. Thus, in a binary Sn—Zn alloy composition which includes a hot-dip coating layer in accordance with exemplary embodiments of the present invention, a ratio of the endothermic value of melting heat generated by the Sn—Zn eutectic crystals and the endothermic value of melting heat generated by the Sn primary crystals can be provided by the following relationship:

(endothermic value of melting heat generated by Sn primary crystals)/ {(endothermic value of melting heat generated by Sn primary crystals)+(endothermic value of melting heat generated by Sn—Zn eutectic crystals)} $\geq 0.3$ As described above, a sacrificial corrosion resistance capability can be provided in a coating layer by including Zn in the Sn-based coating of the hot-dip coating layer. This effect can be used to control corrosion in the inner and outer surfaces of a fuel tank formed using such material. However, in a corrosive environment, if Zn segregated regions exist in the coating layer, such regions may preferentially be eluted because Zn can be inherently eluted at a high speed, and holes may likely be formed by perforated corrosion at the Zn segregated regions.

In composition ranges of the hot-dip coating layer in accordance with exemplary embodiments of the present invention, the hot-dip Sn—Zn coating microstructure can become a solidified microstructure having a mixture of Sn primary crystals and binary Sn—Zn eutectic cells, where Zn may likely be segregated in the eutectic crystal cell-eutectic crystal cell grain boundary. Such Zn segregation in the eutectic crystal cell-eutectic crystal cell grain boundary may occur because of the following reasons:

(a) an effect of a small quantity of impurities having a high affinity with Zn;
(b) a eutectic crystal microstructure in a eutectic crystal cell-eutectic crystal cell grain boundary of a final solidified portion may likely become coarse; and
(c) Zn can be an antecedent phase of Sn—Zn eutectic crystal solidification, and such antecedent Zn phases of different eutectic crystal cells in the eutectic crystal cell-eutectic crystal cell grain boundary may be bonded together.

Zn segregated in a eutectic crystal cell-eutectic crystal cell grain boundary can become a starting point of corrosion, and may likely produce selective corrosion, as described above. It may be possible to alleviate such Zn segregation, for example, by actively growing Sn primary crystals while suppressing Sn eutectic crystal cells from being grown. Because Sn can be crystallized out as primary crystals in a range of compositions of the hot-dip coating layer in accordance with exemplary embodiments of the present invention, when Sn dendrites in a form of a network spread over the coating layer at an initial solidification stage, binary Sn—Zn eutectic cells grown by an eutectic crystal reaction can be suppressed from further growth by arms of the Sn dendrite. Accordingly, large eutectic crystal cells may not collide with each other, and Zn may not be segregated in the eutectic crystal cell-eutectic crystal cell grain boundary, thereby greatly improving a corrosion resistance of the inner and outer surfaces of a fuel tank formed using a material with such exemplary coating.

To actively grow Sn primary crystals, growth starting points (e.g., nucleation sites) of Sn may be extended. During the solidification of the hot-dip coating, solidification may primarily progress from an interface between the coating and the bare steel sheet because heat can be primarily eliminated from the steel sheet side. Accordingly, if a minute unevenness is formed on an underlying alloy layer of the hot-dip coating layer or on the bare steel sheet, it may be possible to form growth starting points (e.g., nucleation sites) of the Sn primary crystal dendrites.

An exemplary technique for providing nucleation sites can be provided to control a shape of the alloy phase (which may be generated, e.g., by bare steel sheet and hot-dip metal) of the underlying layer of the hot-dip coating layer. In order to provide an effect on the Sn nucleation, a minute unevenness can be effective and a technique for generating the alloy phase may be controlled. For example, sites where the alloy phase is being generated may become projections, and sites where the alloy phase is suppressed may become depressions. Such exemplary control can be achieved, e.g., by controlling hot-dip coating bath temperature and hot-dip coating immersion time. If the exemplary steel sheet is subjected to a pre-coating prior to the hot-dip coating, such exemplary control may also be possible by further controlling the type and coating weight of such additional pre-coating.

Sn—Zn metal and Fe (e.g., provided in a bare steel sheet) can be suppressed from being alloyed at sites coated with Ni by pre-coating in the solidification process of the hot-dip coating. Alternatively, Sn—Zn metal and Fe may be alloyed at sites which are not coated with Ni. Thus, an alloy phase having minute unevenness can be generated. When a weight of such pre-coating falls within a range of about 0.01 to 0.3 g/m$^2$ per single surface side, a pre-coating layer may not be coated uniformly, e.g., it may exhibit uncoated regions on the order of a micrometer which can be observable by SEM (e.g., at about a 5000-fold magnification)

Thus, an alloy phase having minute unevenness can be generated by an alloy phase growth difference as described above. The weight of pre-coating may preferably be between about 0.01 and about 0.24 g/m$^2$, or more preferably between about 0.01 and about 0.09 g/m$^2$, which may stably secure nucleation sites. A sufficient Ni coating may be provided using, e.g., a conventional Watt's bath. A typical composition of such Watt's bath can include, e.g., between about 240 and about 350 g/L of nickel sulfate, between about 30 and about 60 g/L of nickel chloride, and between about 30 and about 45 g/L of boric acid, Exemplary coating conditions can include a pH between about 2.5 and about 4.5, a bath temperature between about 40 and about 60° C., and a current density between about 2 and about 10 A/dm$^2$.

Alloying behavior of Fe and of Ni with Sn—Zn metal may appear different from each other. For example, Fe can be alloyed with Sn—Zn metal, while Ni may be suppressed from being alloyed with Sn—Zn metal. As a result, an alloy phase having minute unevenness may be generated. Accordingly, pre-coating using an Fe—Ni alloy can provide the same effects. The composition of an Fe—Ni alloy pre-coating may vary, but should not be extremely biased to either Fe and Ni. For example, a composition of such pre-coating can be between, e.g., about Fe-10 mass % Ni and about Fe-80 mass % Ni. The composition of the pre-coating may preferably be between about Fe-21 mass % Ni and about Fe-70 mass % Ni, because Sn primary crystals can be generated more stably in such a range. The above-described Ni coating Watt's bath with about 30 to 200 g/L of iron sulfate added can be used as an Fe—Ni alloy coating bath. In contrast to elemental Ni, an Fe—Ni alloy may be uniformly coated. Therefore, an upper weight limit for such pre-coating does not have to be set. However, based on economical considerations, the weight of such pre-coating may preferably be between about 0.01 and about 2.0 g/m$^2$ per single side.

Hot-dip coating bath temperature and immersion time have an effect on growth of an alloy phase. For example, the alloy phase may not grow if the hot-dip coating bath temperature is too low, and it may be promoted if the hot-dip coating bath temperature is too high. Based on a manufacturability considerations, a lower limit of the hot-dip coating bath temperature can be set to be about 10 to 50° C. above the liquidus temperature of the hot-dip metal, while an upper limit can be set to be about 100° C. above the liquidus temperature or less. If the hot-dip coating bath temperature is low, there can be a risk of hot-dip metal solidification due to bath temperature irregularity in a hot-dip coating furnace. Alternatively, if the hot-dip coating bath temperature is high, there may be disadvantages such as, e.g., excessive growth of the alloy phase, a requirement that the solidification be cooled after the hot-dip coating, and/or the hot-dip coating may be uneconomical. In an exemplary Sn—Zn coating of the hot-dip coating layer in accordance with exemplary embodiments of the present invention, based on the Sn—Zn composition range, a hot-dip coating bath temperature may preferably be in a range of between about 240° C. and about 300° C., which can allow generation of an alloy phase having minute unevenness by a combination of the above-described pre-coating and immersion time, as described in more detail below.

For example, there may be a tendency to produce an alloy phase that is insufficiently grown if immersion time is short, and an alloy phase that is excessively grown if immersion time is long. In exemplary embodiments of the present invention, the alloy phase may already be grown after an immersion time of about one second, and growth of such alloy phase may be slowly saturated even with a long immersion time. In an actual continuous hot-dip coating, the immersion time is generally at least about 2 seconds. Based on the size of a hot-dip coating furnace, the hot-dip coating layer may generally not be immersed for about 15 seconds or more. A longer immersion time can lead to lower productivity and may be uneconomical. An immersion time between about 2 and about 15 seconds may generate an alloy phase having minute unevenness based on a combination of the pre-coating described above and an appropriate hot-dip coating bath temperature.

Because an unevenness can provide a nucleation site, a minute unevenness that is mechanically formed on the steel sheet can have a similar effect as an unevenness of the alloy phase with respect to nucleation behavior. Exemplary techniques for forming minute unevenness on the steel sheet can include, e.g., a transfer technique using a rolling roll having a minute unevenness, a shot blast technique using a fine rigid powder, and the like.

An effect of a cooling rate after gas wiping performed to control coating weight may also be considered with respect to the conditions for developing Sn primary crystals. Such Sn primary crystals may be first solidified in a microstructure having Sn primary crystals and binary Sn—Zn eutectic crystals. The cooling rate may then be decreased to sufficiently develop the Sn primary crystals. When an exemplary hot-dip Sn—Zn coating layer is manufactured in combination with the above-described pre-coating technique, a cooling rate of the hot-dip Sn—Zn coating layer may preferably be about 30° C./sec or less. Although a lower limit for such cooling rate may not be particularly limited, the productivity may be lowered if the cooling rate is too low. Accordingly, a cooling rate may be preferably about 10° C./sec or more in an actual production process.

A Sn—Zn coating layer having a solidification microstructure in which Sn primary crystals are positively crystallized out, as described above, can exhibit a unique melting behavior. For example, a ratio of an endothermic value of melting heat generated by the Sn—Zn eutectic crystals and an endothermic value of melting heat generated by the Sn primary crystals in the hot-dip coating layer may be provided which satisfy the following relationship:

(endothermic value of melting heat generated by Sn primary crystals)/ {(endothermic value of melting heat generated by Sn primary crystals)+(endothermic value of melting heat generated by Sn—Zn eutectic crystals)}≧0.3

In exemplary embodiments of the present invention, Sn primary crystals can be crystallized out in a state of equilibrium with respect to a solidification behavior of the binary Sn—Zn alloy composition of the hot-dip coating layer. However, in an actual hot-dip Sn—Zn coating process, if specific conditions for crystallizing out the Sn primary crystals as described above are not provided, the hot-dip Sn—Zn coating may be overcooled. Such overcooling can result in a coating microstructure having only Sn—Zn eutectic crystal cells over a wide range of compositions, e.g., from a eutectic crystal point to a low Zn mass %.

Based on a thermal analysis of the coating layer, a definite difference in endothermic values of melting heat generated by Sn primary crystals between a coating layer having grown Sn—Zn eutectic crystal cells, and a coating layer in which Sn primary crystals are sufficiently crystallized out, has been identified. Such difference can be utilized to distinguish between these microstructures.

For example, a coating layer which includes grown Sn—Zn eutectic crystals cells may likely not exhibit an endothermic value of melting heat generated by Sn primary crystals, while primarily exhibiting an endothermic value of melting heat generated by Sn—Zn eutectic crystals. Alternatively, a coating layer in which Sn primary crystals are sufficiently crystallized out may exhibit an endothermic value of melting heat generated by Sn primary crystals. Because a binary Sn—Zn alloy composition of the hot-dip coating layer in accordance with certain exemplary embodiments of the present invention may satisfy the following relationship, such crystal structure may be identifiable. Accordingly, a ratio of the endothermic value of melting heat generated by the Sn—Zn eutectic crystals and the endothermic value of melting heat generated by the Sn primary crystals can be provided by the following relationship:

(endothermic value of melting heat generated by Sn primary crystals)/ {(endothermic value of melting heat generated by Sn primary crystals)+(endothermic value of melting heat generated by Sn—Zn eutectic crystals)}≧0.3

Further, a composition of the hot-dip coating layer in accordance with certain exemplary embodiments of the present invention can exhibit a temperature of an endothermic peak, b, generated by Sn primary crystals melting which may be between about 200° C. and about 230° C., and the temperature of an endothermic peak, a, generated by Sn—Zn eutectic crystals melting may be between about 198° C. and about 200° C. Several techniques may be used to determine such melting behavior. For example, differential scanning calorimetry ("DSC"), a conventional thermal analysis technique, may provide information which leads to a correlation between thermal analysis of melting behavior and corrosion resistance of a coating steel sheet.

DSC is a technique which can include heating of a reference material and a sample simultaneously, providing sufficient energy to cancel a temperature difference between the reference material and the sample, and measuring a temporal variation of the provided energy (e.g., variation of heat content) and a temperature of the reference material. A differential scanning calorimetric curve obtained by such measurement can provide a signal for an endothermic reaction and an exothermic reaction at any temperature (e.g., a peak may be obtained). DSC can facilitate a quantitative measurement of a heat of reaction, because thermal energy is provided as a Joule heat of electricity.

In an exemplary embodiment of the present invention, a DSC7 differential scanning calorimeter (available from PerkinElmer Co., Ltd.) was used. A sample was provided as a hot-dip Sn—Zn coated steel sheet (having a thickness between about 0.5 mm and about 2.0 mm), which was punched to have a diameter of 6 mm and then sealed in an aluminum pan. The heating rate was typically selected from a range of about 2° C./min to about 20° C./min. The results of a measurement were observed to depend on the heating rate. For example, an increase of the heating rate may shift a whole melting behavior to a higher temperature, and a peak resolution may be lowered. However, since variation per hour can increase, a sensitivity of external appearance can be raised, which may be advantageous for detection of minute peaks. Further, obtaining measurements at various heating rates may be preferable because a particular melting behavior may depend on such heating rate.

For example, an efficient and optimal differential scanning calorimetric curve could be obtained at a heating rate of about 2.5° C./min. At this heating rate, it may be possible to separate an endothermic peak between about 198° C. and about 200° C. from an endothermic peak between about 200° C. and about 230° C.

A temperature of an endothermic peak can indicate the highest temperature of the endothermic peak (e.g., a peak top temperature) provided by the differential scanning calorimetric curve. An endothermic energy value can be obtained from an area on a graph of such curve defined by a baseline and the curve.

For example, a perfect corrosion resistance may be expected by applying a post-treatment of coating a surface of the coating layer with another coating layer containing an inorganic compound, an organic compound or a composite thereof. Such post-treatment can be very compatible with the Sn—Zn coating layer, and it may provide a coating of a defective portion of the Sn—Zn coating layer such as, e.g., microscopic pin holes, dissolving the coating layer to restore pin holes, and the like; thereby greatly improving the corrosion resistance.

EXAMPLE 1

Annealed and tempered steel sheets, 0.8 mm thick, were coated with 0.1 g/m² of Ni using an electroplating technique with an exemplary Watt's bath containing 240 g/L of nickel sulfate, 45 g/L of nickel chloride, and 30 g/L of boric acid, and having a pH of 4.0. The bath temperature was 50° C. and a current density per single surface side of 10 A/dm² was used. The steel sheet were then coated with a coating flux containing zinc chloride, ammonium chloride and hydrochloric acid, and subsequently introduced into Sn—Zn hot-dip coating baths held at 280° C. After reacting the coating bath with a surface of the steel sheet for 5 seconds, the steel sheets were drawn out of the coating baths. The coating weight (e.g., overall coating weight of Sn+Zn) was controlled to be about 40 g/m² per single surface side using a gas wiping technique. After the gas wiping, the cooling rate was varied using an air jet cooler to solidify the hot-dip coating layer.

A curve for such Sn—Zn coating steel sheet was obtained using the DSC7 differential scanning calorimeter. The Sn—Zn coating steel sheet was punched to have a diameter of 6 mm and then was sealed in an aluminum pan to provide a sample for the DSC. Measurement of the sample was conducted in a range from room temperature to 250° C., using a heating rate of about 2.5° C./min. Temperatures of the endothermic peaks, a and b, were obtained from the highest temperatures of the endothermic peaks (e.g., peak top temperatures) depicted by the differential scanning calorimetric curve, and endothermic energy values were obtained from areas on a graph of the curve defined by a baseline and the curve.

Expected corrosion resistance of an outer surface of a fuel tank in a salt-damaged environment was evaluated based on an area ratio of red rust observed after SST960 hours. For example, an area ratio of red rust of about 10% or less was determined to be a good result.

Expected corrosion resistance of an inner surface of a fuel tank was evaluated as follows. A corrosive liquid was prepared by adding 10 vol % of water to an intentionally deteriorated gasoline which had been left at 100° C. for 24 hours in a pressure vessel. A corrosion test was conducted in which a coating steel sheet that was formed with a draw-bead (e.g., a reduction rate of sheet thickness of about 14%, and a length of 30×35 mm of edge and rear face seals) was corroded at 45° C. for three weeks in 350 ml of the corrosive liquid. The types and amounts of metal ions eluted in the corrosion test were measured. An elution of metal ions less than about 200 ppm based on the total amount of metal was determined to be a good result.

FIG. 1 shows an exemplary differential scanning calorimetric curve which was obtained for Sample No. 1. Table 1 shows results obtained for this evaluation for several samples. Exemplary Sample Nos. 1 to 5 shown in Table 1 exhibited a durability sufficient for use in applications such as, e.g., formation of fuel tanks. Sample Nos. 1 to 3 were prepared and analyzed to examine the effect of cooling rate. Although the observed endothermic value ratio decreased (e.g., an amount of Sn primary crystals decreased) with an increase of cooling rate, Sample No. 3 exhibited a sufficient amount of such Sn primary crystals to be of practical use.

Comparative Sample No. 6, for example, exhibited a low Zn content (e.g., in mass %). Thus, a sufficient sacrificial corrosion resistance effect was not obtained in this sample, and corrosion resistance of the outer surface was somewhat deteriorated. Comparative Example Nos. 7 and 8 exhibited a relatively high Zn content and a relatively low endothermic value ratio, and Sn primary crystals were not observed. Because Zn segregation at the eutectic crystal cell grain boundary and growth of coarse Zn crystals were promoted in such sample, corrosion resistance of the inner and outer surfaces of the fuel tanks deteriorated.

Results of the comprehensive evaluation on each sample described above are summarized in Table 1 as: A—Good, excellent corrosion resistance; B—Fair, usable; and C—Poor, unusable.

TABLE 1

| | | | | Coating layer | | | |
| --- | --- | --- | --- | --- | --- | --- | --- |
| | | | | Endortherm generated by Sn—Zn eutectic crystals melting | | Endortherm generated by Sn primary crystals melting | |
| Example | Sample No. | Coating composition | Cooling rate (° C./s) | Endothermic temperature (° C.) | Endothermic value $\Delta$He (J/g) | Endothermic temperature (° C.) | Endothermic value $\Delta$Hp (J/g) |
| 1 | 1 | Sn-8 mass % of Zn | 15 | 199 | 0.11 | 211 | 0.47 |
| | 2 | Sn-8 mass % of Zn | 25 | 199 | 0.26 | 208 | 0.67 |
| | 3 | Sn-8 mass % of Zn | 35 | 199 | 0.5 | 203 | 0.31 |
| | 4 | Sn-4 mass % of Zn | 15 | 199 | 0.06 | 217 | 0.6 |
| | 5 | Sn-2 mass % of Zn | 15 | 199 | 0.01 | 224 | 0.44 |
| | 6 | Sn-0.5 mass % of Zn | 15 | 199 | 0.005 | 231 | 0.95 |
| | 7 | Sn-10 mass % of Zn | 15 | 199 | 0.15 | — | — |
| | 8 | Sn-15 mass % of Zn | 15 | 199 | 0.18 | — | — |
| 2 | 9 | Sn-8 mass % of Zn | 15 | 199 | 0.14 | 211 | 0.31 |

| Example | Sample No. | Coating layer Endothermic value ratio, $\Delta$Hp/($\Delta$Hp + $\Delta$He) | Outer surface corrosion resistance Red rust area ratio (%) | Inner surface corrosion resistance Elution amount of metal (ppm) | Comprehensive evaluation | Remarks |
| --- | --- | --- | --- | --- | --- | --- |
| 1 | 1 | 0.81 | 2 | 35 | A | Inventive Example |
| | 2 | 0.72 | 5 | 70 | A | Inventive Example |
| | 3 | 0.38 | 8 | 160 | B | Inventive Example |
| | 4 | 0.91 | 7 | 25 | A | Inventive Example |
| | 5 | 0.98 | 9 | 10 | B | Inventive Example |
| | 6 | 0.99 | 30 | 40 | C | Comparative Example |

TABLE 1-continued

| | 7 | — | 15 | 600 | C | Comparative Example |
|---|---|---|---|---|---|---|
| | 8 | — | 12 | 1300 | C | Comparative Example |
| 2 | 9 | 0.69 | 0 | 15 | A | Inventive Example |

EXAMPLE 2

A cold rolled steel sheet 0.8 mm thick was used, having a root-mean square ("RMS") roughness of about 1.5 μm provided by a work roll. After rolling oil on the steel sheet was removed by heat using a conventional Sendzimir technique, a surface of the steel sheet was deoxidized. The steel sheet was then introduced into a Zn coating bath at 300° C. containing about 8 mass % Sn. RMS roughness can be obtained by dividing an integrated value of a square of a roughness curve in any interval by the interval length, and calculating a square root of such divided value.

After reacting the coating bath with the surface of the steel sheet for about 3 seconds, the steel sheet was drawn out of the coating bath. The coating weight (e.g., overall coating weight of Sn—Zn) was controlled to be about 40 g/m² per single surface side using a gas wiping technique.

Evaluation results of this Sample No. 9 are shown in Table 1. For example, sufficient growth of Sn primary crystals was observed. The corrosion resistance of an outer surface of a fuel tank in a salt-damaged environment was determined to be good, with little or no formation of red rust, although white rust was observed after SST960 hours. The corrosion resistance of an inner surface of the fuel tank was also determined to be good, with a small amount of Zn of the coating layer being eluted as eluted metal ions in an amount of about 15 ppm.

EXAMPLE 3

Annealed and tempered steel sheets having a thickness of about 0.8 mm were smoothly and uniformly coated with about 0.5 g/m² of Ni using an electroplating technique with an exemplary Watt's bath containing 240 g/L of nickel sulfate, 45 g/L of nickel chloride, and 30 g/L of boric acid, and having a pH of 4.0. The bath temperature was 50° C. and a current density per single surface side of 10 A/dm² was used. These steel sheets were then coated with a coating flux containing zinc chloride, ammonium chloride, and hydrochloric acid, and then were introduced into a Sn—Zn hot-dip coating bath held at about 280° C. After reacting the coating bath with a surface of the steel sheet for 5 seconds, the steel sheets were drawn out of the coating bath. The coating weight (e.g., overall coating weight of Sn+Zn) was then controlled to be about 40 g/m² per single surface side using a gas wiping technique.

Figure 2:
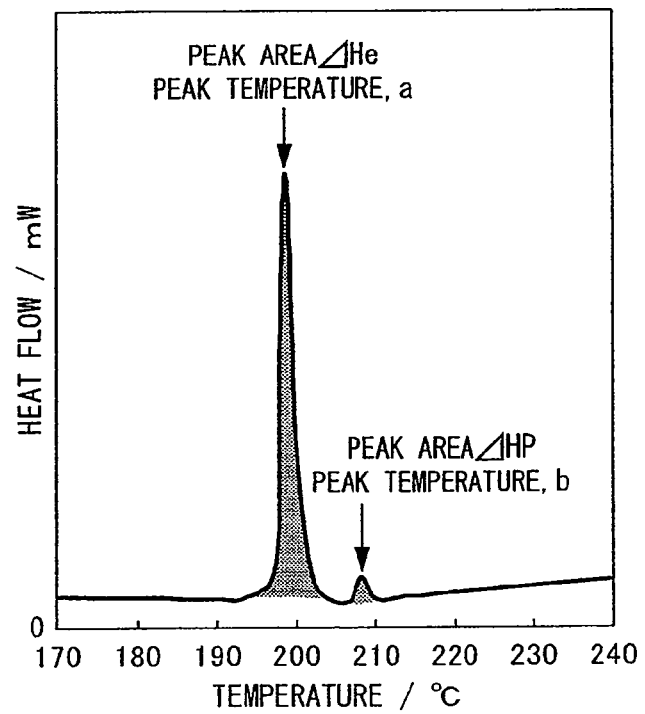
FIG. 2 is a graph showing an exemplary differential scanning calorimetric curve of a conventional coating layer.

FIG. 2 shows an exemplary differential scanning calorimetric curve obtained for Sample No. 10. Table 2 shows results obtained for this evaluation for several samples. For example, Sample No. 10 in Table 2 exhibited mostly Sn—Zn eutectic crystals, while few Sn primary crystals were crystallized out. This sample exhibited Zn segregation at eutectic crystal cell grain boundary based on observation using an optical microscope. With respect to corrosion resistance of an outer surface of a fuel tank, an area ratio of red rust of about 80% was observed after SST960 hours, and a plurality of pitting corrosion sites were also observed. With respect to corrosion resistance of an inner surface of the fuel tank, Zn and Fe were eluted as eluted metal ions in an amount of about 1800 ppm, and a pitting corrosion was observed. Sample Nos. 11 to 13 were observed to exhibit a slightly higher ratio of endothermic value of melting heat generated by Sn primary crystals as compared with Sample No. 10, but such ratio did not exceed a value of 0.3, and slight improvement in the corrosion resistance was observed in these samples.

TABLE 2

| | | | | Coating layer | | | |
|---|---|---|---|---|---|---|---|
| | | | | Endotherm generated by Sn—Zn eutectic crystals melting | | Endotherm generated by Sn primary crystals melting | |
| Example | Sample No. | Coating composition | Cooling rate (° C./s) | Endothermic temperature (° C.) | Endothermic value ΔHe (J/g) | Endothermic temperature (° C.) | Endothermic value ΔHp (J/g) |
| 3 | 10 | Sn-8 mass % of Zn | 15 | 199 | 0.98 | 207 | 0.054 |
| | 11 | Sn-7 mass % of Zn | 15 | 199 | 0.89 | 209 | 0.13 |
| | 12 | Sn-6 mass % of Zn | 15 | 199 | 0.78 | 210 | 0.19 |
| | 13 | Sn-5 mass % of Zn | 15 | 199 | 0.71 | 211 | 0.24 |

| Example | Sample No. | Coating layer Endothermic value ratio ΔHp/(ΔHp + ΔHe) | Outer surface corrosion resistance Red rust area ratio (%) | Inner surface corrosion resistance Elution amount of metal (ppm) | Comprehensive evaluation | Remarks |
|---|---|---|---|---|---|---|
| 3 | 10 | 0.05 | 80 | 1800 | C | Comparative Example |

TABLE 2-continued

| | | | | | |
|---|---|---|---|---|---|
| 11 | 0.13 | 60 | 900 | C | Comparative Example |
| 12 | 0.2 | 25 | 400 | C | Comparative Example |
| 13 | 0.25 | 15 | 150 | C | Comparative Example |

EXAMPLE 4

Tempered and annealed steel sheets having a thickness of about 0.8 mm were coated with about 1.0 g/m² of a Ni—Ni alloy having various compositions using an electroplating technique. Fe—Ni coating baths containing about 240 g/L of nickel sulfate, about 30 g/L of nickel chloride, about 30 g/L of boric acid, about (15), 30, 50, 100, 150, 200, or (250) g/L of iron sulfate were used. Such coating baths had a pH of about 2.5 and a bath temperature of about 50° C. A current density per single surface side of about 10 A/dm² was used. These exemplary steel sheets were then coated with a coating flux containing zinc chloride, ammonium chloride, and hydrochloric acid, and subsequently introduced into Sn—Zn hot-dip coating baths having various compositions at temperatures of 250, 300, 350, and 400° C. After reacting the coating bath with a surface of the steel sheet for times of 2, 5, 10, 15 and 20 seconds, the steel sheets were drawn out of the coating baths. A coating weight (e.g., overall coating weight of Sn+Zn) was controlled to be about 40 g/m² per single surface side using a gas wiping technique. Tables 3 and 4 show results obtained for evaluation of these samples.

TABLE 3

| | | | | | | Coating layer Endortherm generated by Sn—Zn eutectic crystals melting | |
|---|---|---|---|---|---|---|---|
| Sample No. | Pre Fe—Ni composition | Coating composition | Coating bath temperature (° C.) | Coating immersion time (s) | Cooling rate (° C./s) | Endothermic temperature (° C.) | Endothermic value ΔHe (J/g) |
| 14 | Fe-5 mass % Ni | Sn-8 mass % Zn | 300 | 5 | 15 | 199 | 0.24 |
| 15 | Fe-10 mass % Ni | Sn-8 mass % Zn | 300 | 5 | 15 | 199 | 0.18 |
| 16 | Fe-20 mass % Ni | Sn-8 mass % Zn | 300 | 5 | 15 | 199 | 0.11 |
| 17 | Fe-40 mass % Ni | Sn-8 mass % Zn | 300 | 5 | 15 | 199 | 0.13 |
| 18 | Fe-60 mass % Ni | Sn-8 mass % Zn | 300 | 5 | 15 | 199 | 0.34 |
| 19 | Fe-80 mass % Ni | Sn-8 mass % Zn | 300 | 5 | 15 | 199 | 0.41 |
| 20 | Fe-90 mass % Ni | Sn-8 mass % Zn | 300 | 5 | 15 | 199 | 0.24 |
| 21 | Fe-20 mass % Ni | Sn-0.5 mass % Zn | 300 | 5 | 15 | 199 | 0.01 |
| 22 | Fe-20 mass % Ni | Sn-2 mass % Zn | 300 | 5 | 15 | 198 | 0.01 |
| 23 | Fe-20 mass % Ni | Sn-4 mass % Zn | 300 | 5 | 15 | 199 | 0.06 |

| | Coating layer | | | Outer surface | Inner surface | | |
|---|---|---|---|---|---|---|---|
| | Endortherm generated by Sn primary crystals melting | | Endothermic | corrosion resistance | corrosion resistance | | |
| Sample No. | Endothermic temperature (° C.) | Endothermic value ΔHp (J/g) | value ratio ΔHp/ (ΔHp + ΔHe) | Red rust area ratio (%) | Elution amount of metal (ppm) | Comprehensive evaluation | Remarks |
| 14 | 208 | 0.1 | 0.29 | 11 | 180 | B | Comparative Example |
| 15 | 208 | 0.32 | 0.64 | 8 | 90 | A | Inventive Example |
| 16 | 211 | 0.47 | 0.81 | 1.5 | 25 | A | Inventive Example |
| 17 | 211 | 0.42 | 0.76 | 3 | 40 | A | Inventive Example |
| 18 | 210 | 0.4 | 0.54 | 5 | 50 | A | Inventive Example |
| 19 | 210 | 0.25 | 0.38 | 8 | 90 | A | Inventive Example |
| 20 | 209 | 0.08 | 0.25 | 25 | 450 | C | Comparative Example |
| 21 | 231 | 0.95 | 0.99 | 30 | 40 | C | Comparative Example |

TABLE 3-continued

| | | | | | | | |
|---|---|---|---|---|---|---|---|
| 22 | 224 | 0.44 | 0.98 | 12 | 10 | B | Inventive Example |
| 23 | 217 | 0.6 | 0.91 | 7 | 25 | A | Inventive Example |

TABLE 4

| Sample No. | Pre Fe—Ni composition | Coating composition | Coating bath temperature (° C.) | Coating immersion time (s) | Cooling rate (° C./s) | Coating layer Endortherm generated by Sn—Zn eutectic crystals melting Endothermic temperature (° C.) | Coating layer Endortherm generated by Sn—Zn eutectic crystals melting Endothermic value $\Delta$He (J/g) |
|---|---|---|---|---|---|---|---|
| 24 | Fe-20 mass % Ni | Sn-10 mass % Zn | 300 | 5 | 15 | 199 | 0.12 |
| 25 | Fe-20 mass % Ni | Sn-8 mass % Zn | 250 | 5 | 15 | 199 | 0.11 |
| 26 | Fe-20 mass % Ni | Sn-8 mass % Zn | 350 | 5 | 15 | 199 | 0.11 |
| 27 | Fe-20 mass % Ni | Sn-8 mass % Zn | 400 | 5 | 15 | 199 | 0.09 |
| 28 | Fe-20 mass % Ni | Sn-8 mass % Zn | 300 | 2 | 15 | 199 | 0.10 |
| 29 | Fe-20 mass % Ni | Sn-8 mass % Zn | 300 | 10 | 15 | 199 | 0.11 |
| 30 | Fe-20 mass % Ni | Sn-8 mass % Zn | 300 | 15 | 15 | 199 | 0.11 |
| 31 | Fe-20 mass % Ni | Sn-8 mass % Zn | 300 | 20 | 15 | 199 | 0.11 |
| 32 | Fe-20 mass % Ni | Sn-8 mass % Zn | 300 | 5 | 25 | 199 | 0.26 |
| 33 | Fe-20 mass % Ni | Sn-8 mass % Zn | 300 | 5 | 30 | 199 | 0.51 |

| Sample No. | Coating layer Endortherm generated by Sn primary crystals melting Endothermic temperature (° C.) | Coating layer Endortherm generated by Sn primary crystals melting Endothermic value $\Delta$Hp (J/g) | Endothermic value ratio $\Delta$Hp/($\Delta$Hp + $\Delta$He) | Outer surface corrosion resistance Red rust area ratio (%) | Inner surface corrosion resistance Elution amount of metal (ppm) | Comprehensive evaluation | Remarks |
|---|---|---|---|---|---|---|---|
| 24 | — | — | — | 15 | 600 | C | Comparative Example |
| 25 | 212 | 0.47 | 0.81 | 2 | 35 | A | Inventive Example |
| 26 | 211 | 0.48 | 0.82 | 2 | 40 | A | Inventive Example |
| 27 | 210 | 0.46 | 0.83 | 3 | 55 | A | Inventive Example |
| 28 | 210 | 0.47 | 0.82 | 2 | 25 | A | Inventive Example |
| 29 | 211 | 0.45 | 0.81 | 4 | 45 | A | Inventive Example |
| 30 | 211 | 0.43 | 0.8 | 2 | 35 | A | Inventive Example |
| 31 | 211 | 0.47 | 0.81 | 2 | 35 | A | Inventive Example |
| 32 | 208 | 0.67 | 0.72 | 5 | 70 | A | Inventive Example |
| 33 | 203 | 0.31 | 0.38 | 9 | 140 | B | Inventive Example |

Sample Nos. 14 to 20 were prepared to examine an effect of a pre Fe—Ni composition on material properties. Sample Nos. 15 to 19 included compositions between about Fe-10 mass % of Ni and about Fe-80 mass % of Ni. Sufficient generation of Sn primary crystals was observed in these samples, an endothermic value ratio was observed to be about 0.3 or higher, and these samples exhibited excellent corrosion resistance. However, in Sample Nos. 14 and 20 which included compositions more biased to either Fe or Ni, insufficient generation of Sn primary crystals was observed, and the endothermic value ratio was less than about 0.3. These samples exhibited poor corrosion resistance.

Sample Nos. 21 to 24 were prepared to examine an effect of a Sn—Zn composition on material properties. For example, Sample No. 21 included an insufficient amount of Zn, sacrificial corrosion capability was observed to be insufficient, and this sample exhibited poor outer surface corrosion resistance. Sample No. 24, in contrast, included an excessive amount of Zn, and an elution amount of metal became significantly large. Sample Nos. 22 and 23, which contained intermediate amounts of Zn as compared with Sample Nos. 21 and 24, exhibited sacrificial corrosion resistance capability, suppressed an excessive elution of Zn, and exhibited a balanced excellent corrosion resistance.

Sample Nos. 25 to 27 were prepared to examine an effect of a temperature of the hot-dip coating bath, and Sample Nos. 28 to 31 were prepared to examine an effect of a hot-dip coating immersion time. All of these samples exhibited good results, and variations in these conditions appeared to have little effect on the endothermic value ratio observed in practical use ranges.

Sample Nos. 32 to 33 were prepared to examine an effect of a cooling rate. Although the endothermic value ratio was observed to decrease with an increase of the cooling rate (e.g., an amount of Sn primary crystals decreased), even Sample No. 33 had sufficient amount of such Sn primary crystals to be of practical use.

EXEMPLARY INDUSTRIAL APPLICABILITY

Exemplary hot-dip Sn—Zn coated steel sheet in accordance with exemplary embodiments of the present invention can exhibit excellent corrosion resistance, formability and weldability, as well as long-term durability against deteriorated gasoline and the like. Accordingly, such hot-dip Sn—Zn coated steel sheet may be useful for a wide range of applications including, e.g., as Pb-free materials for manufacture of fuel tanks and the like.

The foregoing merely illustrates the exemplary principles of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the invention and are thus within the spirit and scope of the invention. All publications, applications and patents cited above are incorporated herein by reference in their entireties.

The invention claimed is:

1. A method for manufacturing a hot-dip Sn—Zn coated steel sheet, comprising:
   pre-coating a Fe—Ni alloy containing between about 10 to 80 mass % of Ni, and a remainder being Fe on a steel sheet;
   immersing the steel sheet into a Sn—Zn hot-dip coating bath so as to form a hot-dip coating layer on the steel sheet;
   cooling the hot-dip coating layer at a cooling rate of about 10° C./sec to about 30° C./sec so as to obtain a hot-dip Sn—Zn coated steel sheet;
   measuring a differential scanning calorimetric curve of the hot-dip Sn—Zn coated steel sheet by a differential scanning calorimetry; and
   distinguishing whether the hot-dip Sn—Zn coated steel sheet has an objective microstructure by the measured differential scanning calorimetric curve,
   wherein the objective microstructure satisfies the following formula:

(endothermic value of melting heat generated by Sn primary crystals)/{(endothermic value of melting heat generated by Sn primary crystals)+(endothermic value of melting heat generated by Sn—Zn eutectic crystals)}$\geq$0.3.

2. The method according to claim 1, wherein the steel sheet is immersed into the Sn—Zn hot-dip coating bath under conditions where the hot-dip coating bath temperature is in a range between about 240° C. and 300° C. and the immersion time is in a range of about 2 to 15 seconds so as to form the hot-dip coating layer comprising between about 1 mass % and 8.8 mass % of Zn and a remainder comprising between about 91.2 mass % and 99.0 mass % of Sn and inevitable impurities on a surface of the steel sheet.

3. The method according to claim 1, wherein the objective microstructure has properties such that a temperature of an endothermic peak generated by the Sn primary crystals melting is between about 200° C. and 230° C., and a temperature of an endothermic peak generated by the Sn—Zn eutectic crystals melting is between about 198° C. and 200° C.

4. The method according to claim 1, wherein the hot-dip Sn—Zn coated steel sheet including the hot-dip coating layer having the objective microstructure has an outer surface corrosion resistance exhibiting about 10% or less of an area ratio of red rust occurring after a salt spray test, an SST of 960 hours and has an inner surface corrosion resistance exhibiting less than about 200 ppm of an elution amount of metal ions in a corrosion test.

5. The method according to claim 1, further comprising conducting a corrosion test by:
   leaving a gasoline at about 100° C. for approximately 24 hours in a pressure vessel to prepare a forcedly-deteriorated gasoline;
   adding about 10 vol. % of water to the forcedly-deteriorated gasoline to prepare a corrosive liquid;
   forming a sample of a coated steel sheet having an approximately 30×35 mm of edge and rear face seals with a draw-bead at a reduction rate of sheet thickness of about 14%;
   corroding the sample in 350 ml of the corrosive liquid at about 45° C. for about three weeks; and
   measuring an elution amount of eluted metal ions.

6. The method according to claim 1, wherein the hot-dip coating layer comprises between about 4 mass % and 8.8 mass % of Zn and a remainder comprises between about 91.2 mass % and 96.0 mass % of Sn and inevitable impurities.

* * * * *